(12) United States Patent
Ulin et al.

(10) Patent No.: US 8,609,044 B2
(45) Date of Patent: Dec. 17, 2013

(54) VESSEL FOR PERFORMING MICROWAVE-ASSISTED CHEMISTRY ON SMALL VOLUMES OF REAGENTS

(75) Inventors: Johan Ulin, Uppsala (SE); Per-Gunnar Eriksson, Uppsala (SE); Fredrik Ekdahl, Sollentuna (SE)

(73) Assignee: Biotage AB, Uppsala (SE)

( * ) Notice: Subject to any disclaimer, the term of this patent is extended or adjusted under 35 U.S.C. 154(b) by 1445 days.

(21) Appl. No.: 10/539,045

(22) PCT Filed: Dec. 18, 2003

(86) PCT No.: PCT/SE03/01996
§ 371 (c)(1),
(2), (4) Date: Mar. 6, 2006

(87) PCT Pub. No.: WO2004/054706
PCT Pub. Date: Jul. 1, 2004

(65) Prior Publication Data
US 2006/0147352 A1 Jul. 6, 2006

Related U.S. Application Data

(60) Provisional application No. 60/433,970, filed on Dec. 18, 2002.

(30) Foreign Application Priority Data

Dec. 18, 2002 (EP) .................................... 02028410

(51) Int. Cl.
*B01L 3/14* (2006.01)
(52) U.S. Cl.
USPC ............. 422/550; 422/21; 422/400; 422/401; 422/408; 422/500; 422/547; 422/549; 422/554; 422/556; 422/557; 422/558; 422/559; 422/560; 422/561; 422/562; 422/568; 422/570; 422/939; 422/940; 436/164; 436/165; 436/169; 436/170; 436/815; 436/817; 435/13; 435/283.1; 435/287.1; 435/287.7; 435/287.8; 435/287.9; 435/288.7

(58) Field of Classification Search
USPC ........... 422/102, 21, 400, 401, 408, 500, 547, 422/549, 550, 554, 556, 557, 558, 559, 560, 422/561, 562, 568, 570, 939, 940; 436/164, 436/165, 169, 170, 815, 817; 435/13, 435/283.1, 287.1, 287.7, 287.8, 287.9, 435/288.7
See application file for complete search history.

(56) References Cited

U.S. PATENT DOCUMENTS 4,693,867 A * 9/1987 Commarmot et al. .......... 422/64
5,264,185 A 11/1993 Floyd
(Continued)

FOREIGN PATENT DOCUMENTS

DE 197 44 940 A1 9/1998
DE 196 12 265 A1 11/1998
(Continued)

OTHER PUBLICATIONS

International Search Report and International Preliminary Examination Report.

*Primary Examiner* — Dennis M White
(74) *Attorney, Agent, or Firm* — Harness, Dickey & Pierce P.L.C.

(57) ABSTRACT

A micro vial assembly for performing microwave-assisted chemical reactions on small reaction mixture volumes is disclosed, wherein a reaction vessel (10) is sealed through a diaphragm (30) that is capped over an open end of the reaction vessel. The reaction vessel mouths in an end plane of a sleeve (20) surrounding the reaction vessel, the diaphragm being clamped for sealing the open end of the vessel by means of a cap (40) which is secured to the sleeve. The sleeve provides a radial extension of the reaction vessel in order to bridge the radial distance between a wall of the reaction vessel and other components in a system for performing microwave-assisted chemical reactions.

13 Claims, 3 Drawing Sheets

(56) References Cited

U.S. PATENT DOCUMENTS

| | | | |
|---|---|---|---|
| 5,520,886 A * | 5/1996 | Bennett et al. | 422/102 |
| 6,803,237 B2 * | 10/2004 | Manganini et al. | 436/175 |
| 2002/0090736 A1 * | 7/2002 | Ulin | 436/180 |
| 2002/0101310 A1 * | 8/2002 | Jennings | 333/248 |

FOREIGN PATENT DOCUMENTS

| | | |
|---|---|---|
| JP | 61-33657 A | 2/1986 |
| WO | WO 02/052279 A2 | 7/2002 |
| WO | WO 02/089974 A1 | 11/2002 |

* cited by examiner

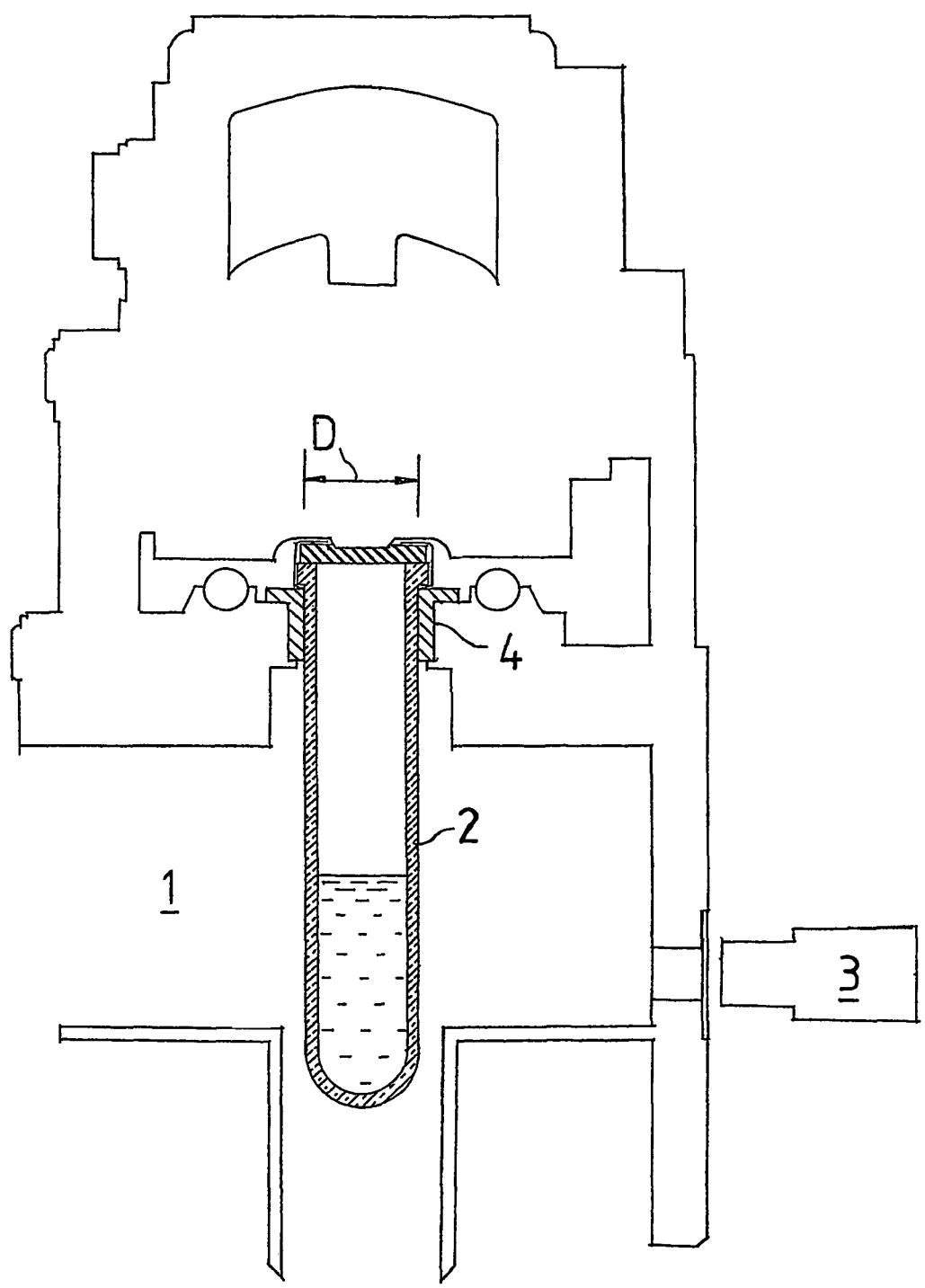
Fig.1 (Prior art vessel)

US 8,609,044 B2

VESSEL FOR PERFORMING MICROWAVE-ASSISTED CHEMISTRY ON SMALL VOLUMES OF REAGENTS

CROSS-REFERENCE TO RELATED APPLICATIONS

This application is a National Phase of PCT Application No. PCTSE2003/001996, filed Dec. 18, 2003, which claims priority under 35 U.S.C. § 119 to U.S. Provisional Application No. 60/433,970 filed on Dec. 18, 2002 and to European Application No. 02028410.5 filed Dec. 18, 2002.

FIELD OF THE INVENTION

The present invention relates to a vial assembly, and more specifically to a sealed micro vial assembly for performing microwave-assisted chemical reactions on small reaction mixture volumes. The invention also refers to a system for performing microwave-assisted chemical reactions on small reaction mixture volumes contained in the micro vial assembly, and to the use of the micro vial assembly and system for performing microwave-assisted organic synthesis reactions.

BACKGROUND AND PRIOR ART

The expression "microwave-assisted chemical reactions" as used herein refers to processes utilizing microwaves to initiate or accelerate chemical reactions. Microwave-assisted chemistry is used for heating materials in a variety of chemical processes, the microwaves interacting directly with the materials including water and a number of organic liquids to cause molecular action and generate heat. Accordingly, microwave-assisted techniques have been developed both for analytic and synthetic processes. The equipment used for performing microwave-assisted chemistry conventionally includes an apparatus having a cavity into which microwaves are guided from a microwave source, typically a magnetron. A vessel, containing the reactants, is introduced in the cavity and positioned for exposure to the microwaves. In some appliances, the vessel is a sealed container in which a reaction can proceed under conditions of both elevated temperature and elevated pressure. The vessel, and the apparatus for exposing the reaction mixture in the vessel to microwaves, provide the basic components in a system for performing microwave-assisted chemical reactions. In commercial practice, the system additionally comprises means for vessel transport to and from the cavity, means for dispensing solvent and reactants to the vessel, detection means, power and control means, and a rack for parking the vessel outside the cavity.

A commercially available reaction vessel in a system for performing microwave-assisted chemical reactions is diagrammatically shown in FIG. 1 of the drawings, attached hereto. This known reaction vessel comprises the well known shape of a test tube, having a penetrable septum capped over the open end of the tube. The tube diameter is dimensioned to fit with other components of the system such as the cavity entrance, gripper means and a parking rack. The vessel has a reaction chamber dimensioned for containment of reaction mixture volumes commonly processed in the system.

In this context, the expression "small reaction mixture volumes" refers to reaction mixture volumes in a micro liter range, such as volumes down to 500 µl or less, for example 1-500 µl, preferably 100-500 µl. Specific problems need to be addressed when designing a reaction vessel for performing microwave-assisted chemistry on small volumes contained in the vessel. For example, the geometry in a top portion of the vessel should be designed to facilitate reflux/re-flow of fluid; the inner diameter of the vessel should be large enough to avoid formation of meniscus of fluid that would be unable to flow back from the top of the vessel; the container volume that is not occupied by the reaction mixture, or head space, should be related to the volume of reactants to avoid exaggerated vaporization at operative pressures and temperatures; in spite of reduced containment dimensions, the vessel exterior must match the cavity entrance diameter and the transporting gripper means, as well as parking racks, and the vessel must be able to position the reaction mixture for dispensing of reactants and/or solvents, for microwave exposure, and for detection.

The present invention aims to solve these and other problems encountered when performing microwave-assisted chemical reactions on small volumes.

A first object of the invention is therefore to provide a micro vial assembly that allows microwave-assisted chemistry to be performed on small volumes.

Another object is to provide a micro vial assembly for performing microwave-assisted chemistry on small volumes, adapted for cooperation with external equipment designed for microwave-assisted chemistry on a larger scale.

Still another object is to provide -a micro vial assembly for performing microwave-assisted chemistry on small volumes, designed to ensure comparative temperature and pressure detection results.

Yet another object is to provide a system that allows microwave-assisted chemistry to be performed on small volumes by incorporating the micro vial assembly of the invention.

These and other objects and aims are met in a micro vial assembly and a system according to the appended claims.

SUMMARY OF THE INVENTION

Briefly, the present invention provides a micro vial assembly for performing microwave-assisted chemical reactions on small volumes, wherein a reaction vessel is sealed by means of a sealing diaphragm that is capped over an open end of the reaction vessel. The reaction vessel mouths in an end plane of a sleeve surrounding the reaction vessel, the diaphragm being clamped to the end plane through a cap engaging an outer boundary of the sleeve. The sleeve provides a radial extension of the reaction vessel in order to bridge the radial distance between a wall of the reaction vessel and other components in a system for performing microwave-assisted chemical reactions.

BRIEF DESCRIPTION OF THE DRAWINGS

The micro vial assembly and system are further described below with reference to the attached drawings. In the drawings, FIG. 1 is a diagrammatic representation of a system for performing microwave-assisted chemical reactions, and a prior art reaction vessel adapted to the system;

DETAILED DESCRIPTION OF THE DRAWINGS

Figure 3:
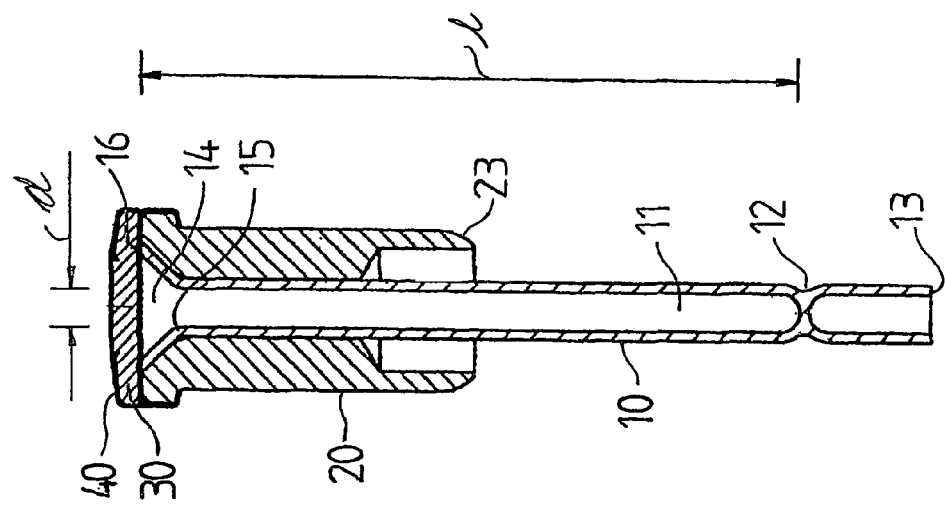
FIG. 3 is a longitudinal section through the micro vial assembly according to one embodiment of the present invention.

The present invention will be more fully described below, modifications thereto successively outlined as the disclosure proceeds.

With reference to FIG. 1, a system for performing microwave-assisted chemical reactions typically comprises an apparatus formed with a cavity 1, here shown with a prior art reaction vessel 2 being inserted and vertically positioned for exposure to microwaves from a microwave source (not shown). In the inserted position, the reaction vessel 2 is located within the operative detection area of a detecting means, such as an infrared light (IR) sensor 3. The reaction vessel 2 has an outer diameter adapted to a diameter D of an entrance to the cavity. The entrance is here represented by an insertion guide 4, determining the diameter D through its inner radius. Though not shown in the drawing, a gripper means for vessel transport to and from the cavity, as well as a rack for parking the vessel outside the cavity are likewise engineered to operate with the diameter D.

Figure 2:
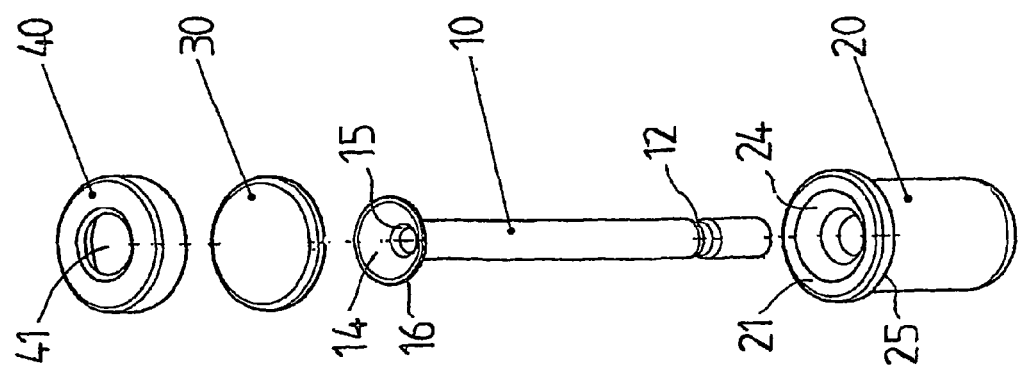
FIG. 2 shows an embodiment of the new micro vial assembly in an exploded perspective view.

FIG. 2 illustrates an embodiment of the new micro vial assembly for performing microwave-assisted chemical reactions on small volumes in a system substantially as mentioned above. The assembly according to the invention comprises a reaction vessel 10, a sleeve member 20, a sealing diaphragm 30 and a cap member 40 as its main components.

The reaction vessel 10 has an open upper end and a closed bottom end, and an inner volume 11 (FIG. 3) forming a reaction chamber which is designed in respect of the small volumes to be contained therein for chemical reactions initiated or accelerated by microwaves. In most cases the reaction vessel 10 preferably is a circular cylinder, however, other cylinders having rounded or polygonal sections may likewise be applied to take advantage of the invention disclosed herein. Accordingly, an inner diameter d of reaction vessel 10 is dimensioned to permit effective microwave absorption by the reactants and solvents in the vessel, and to avoid formation of meniscus of fluid that would stick to the wall of reaction vessel 10 and be hindered to flow back from the top of the vessel. As a non-limiting example, the reaction vessel 10 may have an inner diameter d in the range of a few millimeters, such as 3-5 mm, or as preferred not less than 3.5 mm.

The volume that is not occupied by solvent and reactants contained in the reaction vessel 10, i.e. the headspace volume of reaction vessel 10, is dimensioned in relation to the smallest reaction mixture volume to be handled in order to avoid exaggerated vaporization at operative pressures and temperatures. As a guidance, the head space volume preferably should be less than 20 times the smallest volume processed in the reaction vessel 10. The bottom of reaction vessel 10 may have any preferred shape such as flat, conical, rounded, etc. The axial length 1 of the inner cavity of reaction vessel 10 may be determined through a radial compression 12, forming a closed end above the terminal end 13 of the reaction vessel as illustrated in FIGS. 2 and 3 in order to position the reagents contained therein for energy exposure and detection.

The geometry in the upper end of reaction vessel 10 is determined in order to facilitate reflux of liquid and to minimize the risk of solvent and/or reaction mixture sticking to the inner surface of the reaction vessel. Most preferred, the top portion of reaction vessel 10 is formed with increasing radius towards the open end, forming a widening mouth 14. For example, the mouth 14 may be conical or may alternatively have a progressively increasing radius forming a flared cone (not shown) in the upper end of reaction vessel 10. In all alternatives, the inner wall of reaction vessel 10 connects to the mouth of increased radius through a continuous transition region 15. The mouth 14 has a flange or rim 16, defining the opening in the upper end of reaction vessel 10 and contemplated for a sealed engagement with the diaphragm 30 as will be further discussed below with reference to FIG. 5.

The sleeve member 20 is a cylinder having a through hole and an outer perimeter corresponding to the diameter D, running from an upper end plane 21 towards a bottom end 22, the bottom end being chamfered or formed with a radius 23.

Figure 4:
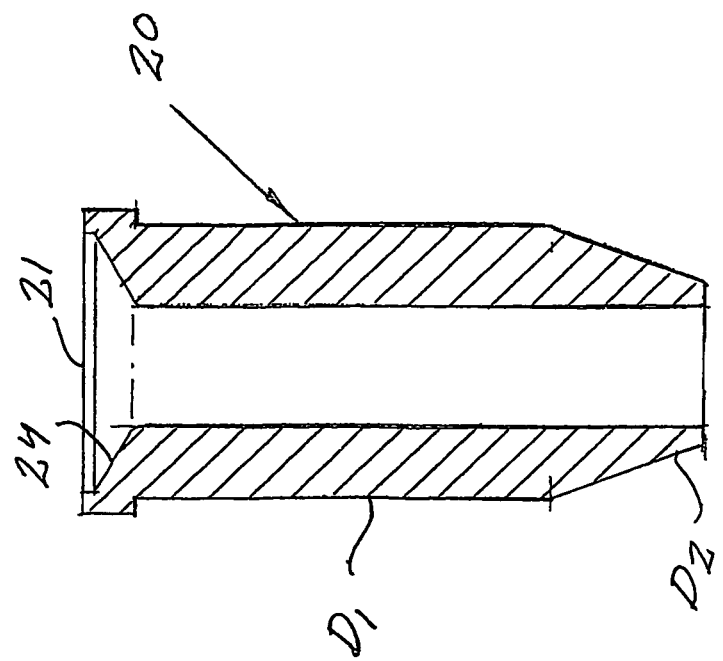
FIG. 4 is a longitudinal section through a sleeve of a preferred embodiment.

In a preferred embodiment, see FIG. 4, the upper end of the sleeve is formed circumferentially for engagement with a cap as explained below, the sleeve having a first diameter portion $D_1$ running from the upper end to meet a reduced diameter portion $D_2$ in a lower end of the sleeve. The portion of reduced diameter $D_2$ preferably is shaped as a truncated cone, and facilitates the insertion of the micro vial assembly into a parking rack or into the microwave cavity of the system, etc.

A recess is formed in the end plane of the sleeve, providing a seat 24 that is correspondingly shaped to receive and support the top portion of increased radius of reaction vessel 10. In the supported position, the reaction vessel 10 extends axially through the sleeve 20, the sleeve providing a radial extension of the reaction vessel in concentric relation about the vessel to bridge the radial distance between the wall of reaction vessel 10 and the operative diameter D of the system.

The axial length of the sleeve 20 is determined with respect to conditions set by the system, such as the structure of parking racks, gripper means, and microwave cavity specifications. Typically, the sleeve terminates above the portion of reaction vessel 10 that is exposed to microwaves and detection.

The upper end of the sleeve 20 is formed with a thread, a groove or other formation, such as a flange 25, for engagement with and for securing the cap member 40 to the sleeve 20.

The cap 40 is formed with a through hole 41 that is positioned to match the mouth 14 of reaction vessel 10 in the assembled relation. The cap advantageously is a metal element that is secured about the perimeter of the sleeve 20, reaching over the outer boundary of the end plane 21. In the illustrated embodiment, the cap 40 is crimped for a firm engagement with the lower side of the flange 25. Alternatively, a modified cap may be secured to the sleeve by a threaded engagement, or by gluing, e.g.

Figure 5:
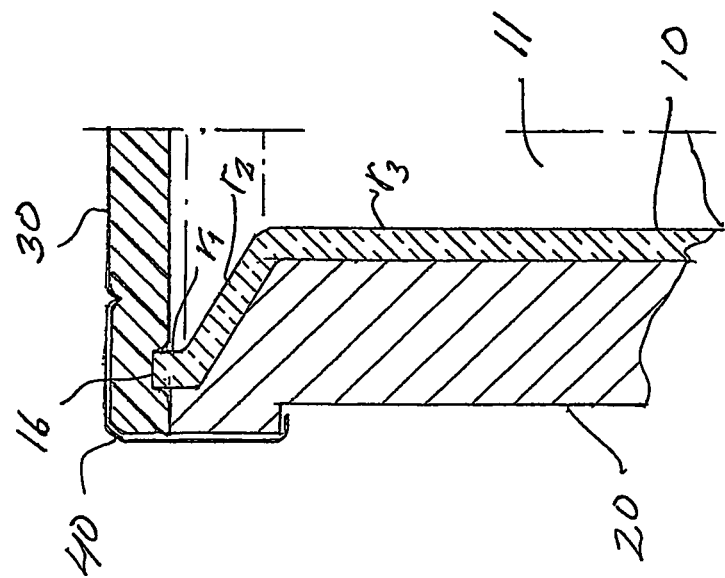
FIG. 5 is an enlarged partial section showing the upper end of the new micro vial assembly.

The sealing diaphragm 30 is clamped between the cap 40 and the end plane 21 of the sleeve 20 in the sealed micro vial assembly. In the clamped position, the diaphragm 30 covers the mouth 14 of reaction vessel 10 and extends in radial direction outwardly of the rim 16. The diaphragm 30 preferably has a radius corresponding to that of the end plane 21. The rim 16, protruding slightly above the end plane 21 when the reaction vessel 10 is accommodated in the sleeve 20 as illustrated in FIG. 3 and 5, is thus depressed in the lower side of the diaphragm for a sealed enclosure of the inner volume 11 of reaction vessel 10. The diaphragm 30 is an elastic element, preferably having self-sealing properties in order to allow penetration by a dispensing means, such as a needle. Suitable materials for a sealing diaphragm are well known within the art and need not be further commented here. Naturally, the diaphragm 30 may have a thickness of approximately one or a few millimeters, e.g., and is compressible so that the rim 16 may be depressed in the lower side of the diaphragm.

Reaction vessel 10 is microwave transparent and made for example of glass. The sleeve 20 may be produced from any suitable material, such as a synthetic material, or metal, or glass. Preferably, the sleeve is made of a microwave-transparent material, such as a polymer material.

In the present invention, the reaction vessel 10 and sleeve 20 are separate elements fixedly secured by the cap 40 and diaphragm 30 as is more closely illustrated in FIG. 5. The diaphragm, clamped by the cap to accommodate the rim 16 and sealing the open end of the vessel, firmly locates the upper end of the vessel in the end plane of the sleeve.

As is apparent from FIG. 5, the rim 16 has an inner wall or inner perimeter that extends transversely to the diaphragm 30. This measure is conceived to provide a constant load area in the lower side of the diaphragm that is exposed to pressures generated from a reaction in the vessel, and to ensure comparative pressure detection results. The inner perimeter of the rim 16 defines a portion of the vessel cavity having a first radius $r_1$. The first radius portion meets a second portion of the vessel cavity having a reducing radius $r_2$, the reducing radius portion smoothly transforming into a portion of continuous radius $r_3$ defining a reaction chamber of the vessel cavity 11. The seat 24 of the sleeve is shaped in order to closely match and support the portion of reducing radius r2.

The above description teaches the elementary features of the new micro vial assembly, the scope of which is defined by the accompanying claims.

The invention claimed is:

1. A micro vial assembly for performing microwave-assisted chemical reactions on small volumes, the assemble comprising:
   a micro-wave transparent reaction vessel having an open upper end and a closed bottom end;
   a deformable cap having a through hole;
   a sealing diaphragm; and
   a sleeve,
   wherein the sleeve is formed with a through hole, the vessel extending axially through the sleeve, the deformable cap extending over the diaphragm and the sleeve so as to secure the vessel to the sleeve while clamping the diaphragm for sealing the open upper end of the vessel, the open upper end of the vessel being formed with a widening portion, the widening portion being received in a corresponding recess formed in an end plane of the sleeve, and the recess providing a seat for the widening portion in the open upper end of the vessel,
   wherein an upper end of the sleeve includes a flange for engagement with and for securing the deformable cap to the sleeve,
   one end of the deformable cap is secured at a perimeter of the upper end of the sleeve and extends over the end plane of the sleeve, and the other end of the deformable cap is crimped for secured engagement with a lower side of the flange,
   wherein the open end of the vessel is defined by a rim protruding above the upper end of the sleeve, when the vessel is supported in the sleeve, the rim being dimensioned to be depressed in a lower side of the diaphragm,
   wherein the rim has an inner perimeter extending transversely to the diaphragm, which seals the open end of the vessel, and an exterior perimeter extending continuously transversely to the diaphragm, and
   wherein the inner perimeter of the rim defines a portion of the vessel cavity having a first radius and a second radius, whereby the first radius portion that meets the second radius portion of the vessel cavity has a reducing radius.

2. The micro vial assembly of claim 1, wherein the upper end of the sleeve is formed circumferentially for engagement with the deformable cap, the sleeve having a first diameter portion running from the upper end to meet a reduced diameter portion in the lower end of the sleeve.

3. The micro vial assembly of claim 2, wherein the portion of reduced diameter in the lower end of the sleeve is a truncated cone.

4. The micro vial assembly of claim 1, wherein the widening portion of the vessel and the seat in the end plane of the sleeve are both conical in shape.

5. The micro vial assembly of claim 1, wherein a bottom of the vessel is formed through a radial compression of the vessel, located above the terminal end of the vessel.

6. The micro vial assembly of claim 1, wherein the vessel has an inner volume including a head-space volume which is less than 20 times that of the smallest reaction mixture volume contained in the vessel.

7. The micro vial assembly of claim 1, wherein the vessel is dimensioned for performing microwave-assisted chemical reactions on small volumes of 500 μl or less.

8. A system for performing microwave-assisted chemical reactions on small reaction mixture volumes, comprising a micro vial assembly according to claim 1.

9. The system of claim 8, wherein the outer perimeter of the sleeve is dimensioned for bridging the radial distance between a wall of the vessel and an entrance diameter, of a microwave cavity in the system.

10. A method of using a micro vial assembly according to claim 1 for performing microwave-assisted chemical reactions, including the step of initiating or accelerating said chemical reactions.

11. A method of using a system according to claim 8 for performing microwave assisted chemical reactions, including the step of initiating or accelerating said chemical reactions.

12. A micro vial assembly for performing microwave-assisted chemical reactions on small volumes, the assembly comprising:
   a deformable cap having a through hole;
   a sealing, elastic diaphragm; and
   a sleeve having a through hole, the sleeve includes a flange for engagement with and for securing the deformable cap to the sleeve,
   wherein the deformable cap, diaphragm, and sleeve are configured to assemble with a micro wave transparent reaction vessel having an open upper end and a closed bottom end, so that upon assembly:
   the vessel extends axially through the sleeve,
   the deformable cap extends over the diaphragm and the sleeve to secure the vessel to the sleeve,
   one end of the deformable cap is secured at a perimeter of an upper end of the sleeve and extends over the end plane of the sleeve, and the other end of the deformable cap is crimped for secured engagement with a lower side of the flange,
   the open upper end of the vessel is formed with a widening portion,
   the widening portion is received in a corresponding recess formed in an end plane of the sleeve, and
   the recess provides a seat for the widening portion in the open upper end of the vessel,
   wherein the open end of the vessel is defined by a rim protruding above the upper end of the sleeve, when the vessel is supported in the sleeve, the rim being dimensioned to be depressed in a lower side of the diaphragm,
   wherein the rim has an inner perimeter extending transversely to the diaphragm, which seals the open end of the vessel, and an exterior perimeter extending continuously transversely to the diaphragm, and
   wherein the inner perimeter of the rim defines a portion of the vessel cavity having a first radius and a second radius, whereby the first radius portion that meets the second radius portion of the vessel cavity has a reducing radius.

13. A micro vial assembly for performing microwave-assisted chemical reactions on small volumes, the assembly comprising:
- a micro-wave transparent reaction vessel having an open upper end and a closed bottom end;
- a cap having a through hole;
- a sealing diaphragm; and
- a sleeve,
- wherein the sleeve is formed with a through hole, the vessel extending axially through the sleeve, the cap extending over outermost portions of the diaphragm and the sleeve so as to secure the vessel to the sleeve while clamping the diaphragm for sealing the open upper end of the vessel, the open upper end of the vessel being formed with a widening portion, the widening portion being received in a corresponding recess formed in an end plane of the sleeve, and the recess providing a seat for the widening portion in the open upper end of the vessel,
- wherein an upper end of the sleeve includes a flange for engagement with and for securing the cap to the sleeve,
- one end of the cap is secured at a perimeter of the upper end of the sleeve and extends over the end plane of the sleeve, and the other end of the cap is crimped for secured engagement with a lower side of the flange,
- wherein the open end of the vessel is defined by a rim protruding above the upper end of the sleeve, when the vessel is supported in the sleeve, the rim being dimensioned to be depressed in a lower side of the diaphragm,
- wherein the rim has an inner perimeter extending transversely to the diaphragm, which seals the open end of the vessel, and an exterior perimeter extending continuously transversely to the diaphragm, and
- wherein the inner perimeter of the rim defines a portion of the vessel cavity having a first radius and a second radius, whereby the first radius portion that meets the second radius portion of the vessel cavity has a reducing radius.

* * * * *